(12) United States Patent
Korenaga

(10) Patent No.: US 11,470,458 B2
(45) Date of Patent: Oct. 11, 2022

(54) IN-VEHICLE DEVICE, VEHICLE, METHOD FOR DOWNLOADING SATELLITE ORBIT INFORMATION, AND PROGRAM FOR DOWNLOADING SATELLITE ORBIT INFORMATION

(71) Applicant: MITSUBISHI HEAVY INDUSTRIES MACHINERY SYSTEMS, LTD., Kobe (JP)

(72) Inventor: Takeshi Korenaga, Tokyo (JP)

(73) Assignee: MITSUBISHI HEAVY INDUSTRIES MACHINERY SYSTEMS, LTD., Hyogo (JP)

( * ) Notice: Subject to any disclaimer, the term of this patent is extended or adjusted under 35 U.S.C. 154(b) by 0 days.

(21) Appl. No.: 16/960,210

(22) PCT Filed: Jan. 31, 2018

(86) PCT No.: PCT/JP2018/003131
§ 371 (c)(1),
(2) Date: Jul. 6, 2020

(87) PCT Pub. No.: WO2019/150470
PCT Pub. Date: Aug. 8, 2019

(65) Prior Publication Data
US 2021/0067925 A1  Mar. 4, 2021

(51) Int. Cl.
*H04W 4/40* (2018.01)
*H04B 7/185* (2006.01)
*G01S 19/07* (2010.01)

(52) U.S. Cl.
CPC .......... *H04W 4/40* (2018.02); *H04B 7/18519* (2013.01); *G01S 19/07* (2013.01)

(58) Field of Classification Search
CPC ........ G01S 19/14; G01S 19/258; G01S 19/08; G01S 19/05; G01S 19/06; G01S 5/0072;
(Continued)

(56) References Cited

U.S. PATENT DOCUMENTS

| | | | |
|---|---|---|---|
| 7,574,215 B1* | 8/2009 | Fan | G01S 5/0027 342/357.42 |
| 2006/0161340 A1* | 7/2006 | Lee | G08G 1/096827 713/186 |

(Continued)

FOREIGN PATENT DOCUMENTS

| | | |
|---|---|---|
| JP | H09-113598 A | 5/1997 |
| JP | 2002-090443 A | 3/2002 |

(Continued)

OTHER PUBLICATIONS

PCT/ISA/210, "International Search Report for International Application No. PCT/JP2018/003131," dated Apr. 24, 2018.
(Continued)

*Primary Examiner* — Oussama Roudani
(74) *Attorney, Agent, or Firm* — Kanesaka Berner and Partners LLP

(57) ABSTRACT

This in-vehicle device is provided with: a determination information acquiring unit for acquiring determination information related to a vehicle; and a timing setting unit for setting, on the basis of the determination information, a timing for downloading satellite orbit information.

9 Claims, 10 Drawing Sheets

(58) Field of Classification Search
CPC ...... G01S 19/10; H04W 4/40; H04B 7/18519; G06N 20/00
See application file for complete search history.

(56) References Cited

U.S. PATENT DOCUMENTS

| | | | | |
|---|---|---|---|---|
| 2008/0262728 | A1* | 10/2008 | Lokshin | G01S 19/48 701/472 |
| 2009/0295630 | A1* | 12/2009 | Wengler | G01S 19/05 342/357.29 |
| 2010/0130229 | A1* | 5/2010 | Sridhara | H04W 4/027 340/686.1 |
| 2012/0116677 | A1* | 5/2012 | Higgison | G01S 5/0072 701/518 |
| 2017/0299724 | A1* | 10/2017 | Hsu | G01S 19/08 |

FOREIGN PATENT DOCUMENTS

| | | |
|---|---|---|
| JP | 2004-163354 A | 6/2004 |
| JP | 2008-139255 A | 6/2008 |
| JP | 2010042788 A | 2/2010 |

OTHER PUBLICATIONS

PCT/ISA/237, "Written Opinion of the International Searching Authority for International Application No. PCT/JP2018/003131," dated Apr. 24, 2018.

\* cited by examiner

FIG. 4

| CHARGING AREA | CHARGING START TIME | CHARGING END TIME | DETERMINATION INFORMATION | | | | |
|---|---|---|---|---|---|---|---|
| A1 | 07:00:00 | 18:00:00 | ... | ... | ... | ... | ... |
| A2 | 12:00:00 | 15:00:00 | ... | ... | ... | ... | ... |
| ... | ... | ... | ... | ... | ... | ... | ... |

IN-VEHICLE DEVICE, VEHICLE, METHOD FOR DOWNLOADING SATELLITE ORBIT INFORMATION, AND PROGRAM FOR DOWNLOADING SATELLITE ORBIT INFORMATION

TECHNICAL FIELD

The present invention relates to an in-vehicle device, a vehicle, a method for downloading satellite orbit information, and a program for downloading satellite orbit information.

BACKGROUND ART

As an in-vehicle device that is mounted in a vehicle, an in-vehicle device that provides various services is known. For example, PTL 1 describes an in-vehicle device that has a charging function of specifying a position of a vehicle based on signals from global positioning system (GPS) satellites, and in a case where the vehicle is present within a charging area, performs charging. An in-vehicle device that specifies a position of a vehicle using a global navigation satellite system (GNSS) satellite of each country instead of a GPS satellite developed by United States of America is also known.

The in-vehicle device that performs positioning calculation using the GNSS satellite needs to receive satellite orbit information, called almanac and ephemeris, from the GNSS satellite and to ascertain a position of the satellite. A time of about 30 seconds is taken for receiving the satellite orbit information. The satellite orbit information received from the GNSS satellite has an expiration date, and in a case where the expiration date has passed, needs to be received again.

As a technique for downloading satellite orbit information from an external server by way of a cellular network without receiving the satellite orbit information directly from a GNSS satellite, an assisted global navigation satellite system (AGNSS) is known. In a case where the satellite orbit information is received using the AGNSS, there is an advantage that the time needed to start positioning can be reduced.

CITATION LIST

Patent Literature

[PTL 1] Japanese Unexamined Patent Application Publication No. 2008-139255

SUMMARY OF INVENTION

Technical Problem

However, the satellite orbit information received using the AGNSS also has an expiration date, and in a case where the expiration date has passed, and the satellite orbit information needs to be downloaded again. Even though the expiration date has not passed, in a case where a time has elapsed from download, an effect of reducing the time needed to start positioning may be lowered. For this reason, the in-vehicle device of the related art using the AGNSS frequently downloads the satellite orbit information, and there is a possibility that an amount of communication with the external server increases and battery consumption of the vehicle increases.

Accordingly, there is a need for a technique that reduces a download frequency of the satellite orbit information using the AGNSS for the purpose of suppressing unneeded communication and reducing battery consumption. In view of the above-described problem, the invention provides an in-vehicle device, a vehicle, a method for downloading satellite orbit information, and a program for downloading satellite orbit information capable of performing download of satellite orbit information using an AGNSS at an appropriate timing for the purpose of suppressing unneeded communication and reducing battery consumption.

Solution to Problem

According to a first aspect of the invention, there is provided an in-vehicle device (10) including a determination information acquisition unit (11) that acquires determination information relating to a vehicle (1), and a timing decision unit (12) that decides a timing of downloading satellite orbit information based on the determination information.

In this way, since the timing of downloading the satellite orbit information from an AGNSS server is decided based on the determination information relating to the vehicle, download can be performed at an appropriate timing. Accordingly, frequent download is prevented, whereby unneeded communication between the in-vehicle device and the AGNSS server can be suppressed, and battery consumption due to communication of the in-vehicle device can be reduced.

According to a second aspect of the invention, in the in-vehicle device (10) according to the first aspect of the invention, the determination information includes information of a predetermined position, and the timing decided by the timing decision unit (12) is a timing at which a current position of the vehicle (1) becomes the predetermined position.

In this way, download is performed based on information of the predetermined position at the timing at which the current position of the vehicle becomes the predetermined position, whereby download can be performed at an appropriate timing at which the need to download the satellite orbit information is high.

According to a third aspect of the invention, in the in-vehicle device (10) according to the first aspect or the second aspect of the invention, the determination information includes information of a predetermined time, and the timing decided by the timing decision unit (12) is a timing at which a current time is a predetermined preparation time before the predetermined time.

In this way, download is performed based on information of the predetermined time at the timing at which the current time is the predetermined preparation time before the predetermined time, whereby download can be performed at an appropriate timing at which the need to download the satellite orbit information is high.

According to a fourth aspect of the invention, in the in-vehicle device (10) according to the third aspect of the invention, the predetermined time is a time having a high use frequency of the vehicle (1).

In this way, the timing of downloading the satellite orbit information from the AGNSS server can be decided based on the time having the high use frequency of the vehicle, and download can be performed at an appropriate timing at which the need to download the satellite orbit information is high. Accordingly, frequent download is prevented, whereby unneeded communication between the in-vehicle device and the AGNSS server can be suppressed, and battery consumption due to communication of the in-vehicle device can be reduced.

According to a fifth aspect of the invention, the in-vehicle device (10) according to the fourth aspect of the invention further includes a learning unit (21) that learns the predetermined time.

In this way, the accuracy of information of the predetermined time included in the determination information can be improved based on past information representing that a user has used the vehicle. Accordingly, download can be performed at a more appropriate timing. In addition, for example, even though a use situation of the vehicle of the user is changed, the predetermined time included in the determination information can be updated to maintain the accuracy.

According to a sixth aspect of the invention, in the in-vehicle device (10) according to any one of the first aspect to the fifth aspect of the invention, the timing decision unit (12) decides the timing of downloading the satellite orbit information based on the determination information such that a download frequency is changed.

In this way, since the timing decision unit decides the timing of downloading the satellite orbit information based on the determination information such that the download frequency is changed, the number of times of download can be adjusted according to the need to download the satellite orbit information.

According to a seventh aspect of the invention, in the in-vehicle device (10) according to the sixth aspect of the invention, the determination information includes information of a predetermined vehicle type, and the timing decision unit (12) decides the timing of downloading the satellite orbit information such that the download frequency becomes higher in a case where a vehicle type of the vehicle (1) is the predetermined vehicle type than in a case where the vehicle type is other than the predetermined vehicle type.

In this way, the timing is decided based on information of the predetermined vehicle type such that the download frequency is changed, whereby the number of times of download can be adjusted to be increased on a vehicle type for which the need to download the satellite orbit information is high.

According to an eighth aspect of the invention, in the in-vehicle device (10) according to the sixth aspect of the invention, the determination information includes information of a predetermined vehicle type, and the timing decision unit decides the timing of downloading the satellite orbit information such that the download frequency becomes lower in a case where a vehicle type of the vehicle (1) is the predetermined vehicle type than in a case where the vehicle type is other than the predetermined vehicle type.

In this way, the timing is decided based on information of the predetermined vehicle type such that the download frequency is changed, whereby the number of times of download can be adjusted to be reduced on a vehicle type for which the need to download the satellite orbit information is low.

According to a ninth aspect of the invention, there is provided a vehicle (1) in which the in-vehicle device (10) according to any one of the first aspect to the eighth aspect of the invention is mounted.

According to a tenth aspect of the invention, there is provided a method for downloading satellite orbit information including a determination information acquisition step of acquiring determination information relating to a vehicle, and a timing decision step of deciding a timing of downloading the satellite orbit information based on the determination information.

According to an eleventh aspect of the invention, there is provided a program for downloading satellite orbit information causing a computer as an in-vehicle device to function as a determination information acquisition unit that acquires determination information relating to a vehicle, and a timing decision unit that decides a timing of downloading the satellite orbit information based on the determination information.

Advantageous Effects of Invention

With the in-vehicle device, the vehicle, the method for downloading satellite orbit information, and a program for downloading satellite orbit information described above, download of the satellite orbit information using an AGNSS can be performed at an appropriate timing, and suppression of unneeded communication and reduction of battery consumption can be achieved.

BRIEF DESCRIPTION OF DRAWINGS

FIG. 4 is a second explanatory view showing an example of determination information of the in-vehicle device according to the first embodiment.

DESCRIPTION OF EMBODIMENTS

First Embodiment

Figure 1:
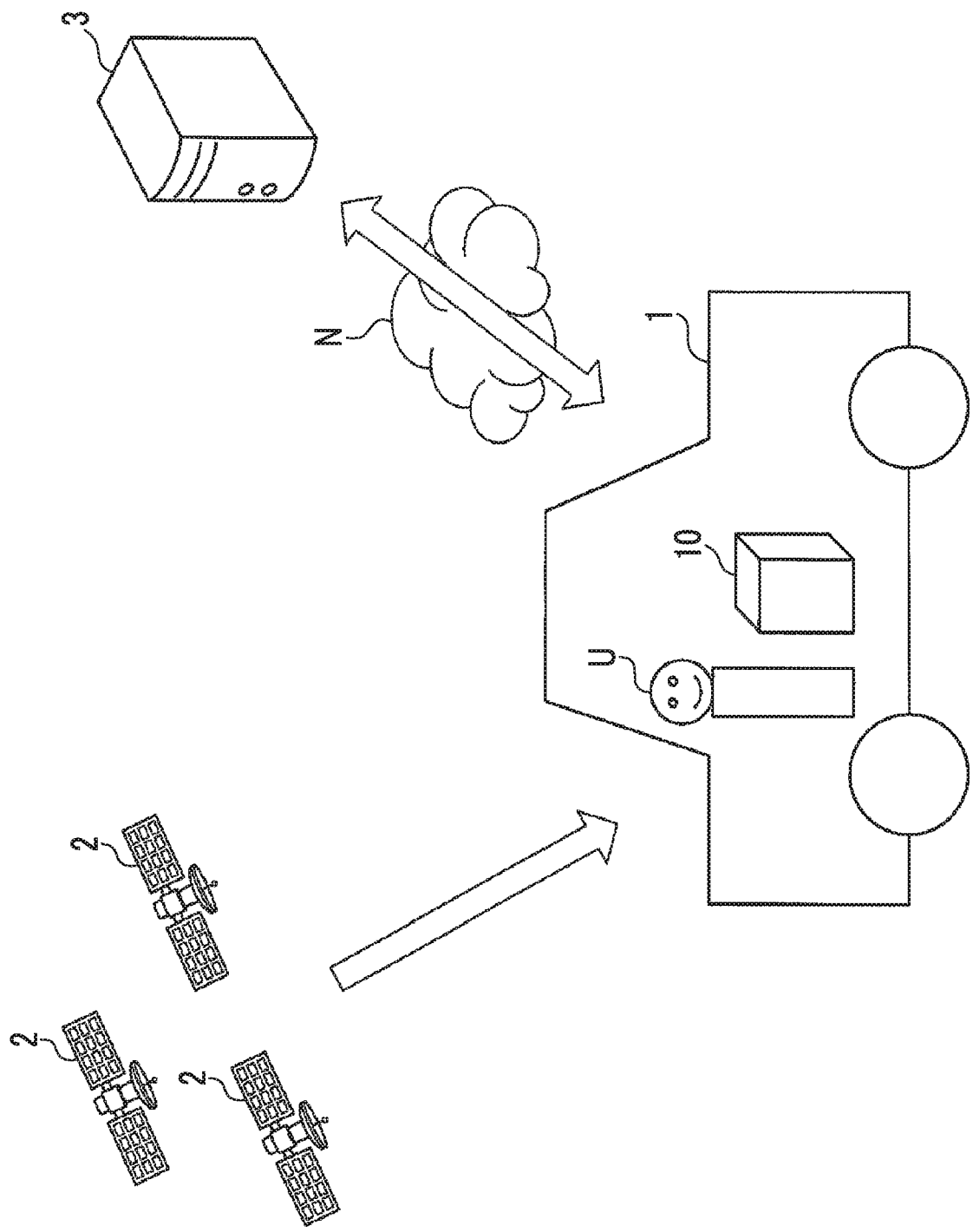
FIG. 1 is a schematic view showing the overall configuration of a vehicle including an in-vehicle device according to a first embodiment.

Hereinafter, a first embodiment will be described referring to the drawings. In all drawings, the same or similar configurations are represented by the same reference numerals, and common description will not be repeated.

Overall Configuration of Vehicle Including
In-Vehicle Device According to First Embodiment FIG. 1 is a schematic view showing the overall configuration of a vehicle 1 including an in-vehicle device according to the first embodiment. The overall configuration of the vehicle 1 including the in-vehicle device 10 according to the first embodiment will be described referring to FIG. 1.

As shown in FIG. 1, the vehicle 1 includes the in-vehicle device 10 that provides a service to a user U who uses the vehicle 1. In the first embodiment, although a case where the vehicle 1 is a four-wheel vehicle will be described, the vehicle 1 may be, for example, a two-wheeled vehicle, such as a motorcycle, a three-wheeled vehicle, or a multi-wheeled vehicle having five or more wheels. In the first embodiment, although a case where the user U is a driver of the vehicle 1 will be described, the user U may be, for example, a user other than the driver, such as an occupant who does not drive the vehicle 1.

The in-vehicle device 10 is mounted in the vehicle 1, and is configured to provide a service to the user U of the vehicle 1. In the first embodiment, a case where the in-vehicle device 10 is in-vehicle equipment having a charging function capable of executing charging processing of a toll or the like of a toll road to the vehicle 1 positioned within a predetermined charging area will be described. However, the in-vehicle device 10 may be other than in-vehicle equipment having a charging function.

For example, the in-vehicle device 10 may be a driving evaluation device having a driving evaluation function of evaluating whether or not the vehicle 1 is appropriately being driven on each of items regarding whether or not the driver of the vehicle 1 is traveling along a decided route, whether or not the driver of the vehicle 1 is traveling at a specified speed, whether or not the driver of the vehicle is traveling at a specified time, and the like. Alternatively, the in-vehicle device 10 may be, for example, a monitoring device that collects probe information, such as a current position, a traveling speed, and a remaining quantity of a battery of the vehicle 1, and performs traffic monitoring.

The in-vehicle device 10 can receive time signals from a plurality of GNSS satellites 2 and can specify the current position of the vehicle 1. Specifically, under a condition that the position of each of the GNSS satellites 2 is determined, the distance from each of a plurality of GNSS satellites 2 can be calculated based on the received time signal and a three-dimensional current position of the vehicle 1 can be specified.

The in-vehicle device 10 can receive satellite orbit information from an AGNSS server 3 through a cellular network N. Here, the satellite orbit information means almanac data and ephemeris data. The almanac data is orbit information relating to all satellites on an orbit, and is also referred to all satellite orbit data. The ephemeris data is accurate position information of each satellite and time information at which a signal is transmitted, and is also referred to as satellite orbit data.

The in-vehicle device 10 can measure the position of the GNSS satellite 2 for use in positioning using the satellite orbit information. Note that the in-vehicle device 10 may receive the satellite orbit information from a plurality of GNSS satellites 2.

The GNSS satellites 2 are artificial satellites of Global Navigation Satellite System (GNSS) of each country. The GNSS satellites 2 include, for example, GPS satellites of United States of America, GLONASS satellites of Russia, Galileo satellites of Europe, BeiDou satellites of China, quasi-zenith satellites of Japan, or the like. The GNSS satellites 2 transmit electric waves including the time signal and the satellite orbit information.

The AGNSS server 3 can transmit the satellite orbit information to the vehicle 1 through the cellular network N.

Functional Configuration of In-Vehicle Device According to First Embodiment

Figure 2:
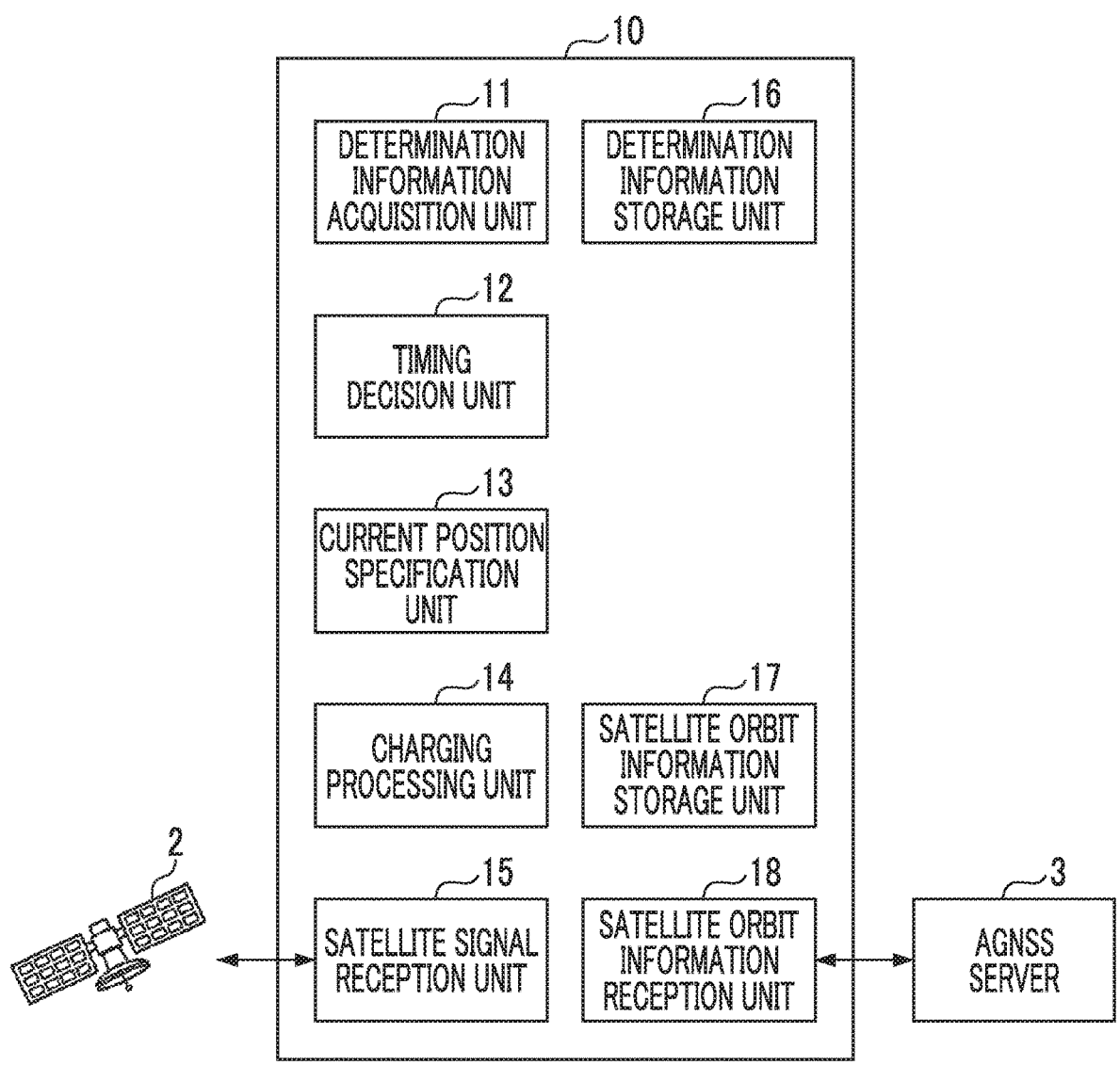
FIG. 2 is a block diagram illustrating the functional configuration of the in-vehicle device according to the first embodiment.

FIG. 2 is a block diagram illustrating the functional configuration of the in-vehicle device 10 according to the first embodiment. The functional configuration of the in-vehicle device 10 according to the first embodiment will be described referring to FIG. 2.

As shown in FIG. 2, the in-vehicle device 10 includes a determination information acquisition unit 11, a timing decision unit 12, a current position specification unit 13, a charging processing unit 14, a satellite signal reception unit 15, a determination information storage unit 16, a satellite orbit information storage unit 17, and a satellite orbit information reception unit 18.

The determination information acquisition unit 11 is configured to acquire determination information relating to the vehicle 1 stored in the determination information storage unit 16. Here, the determination information means information relating to the vehicle 1 for use in determination when the timing decision unit 12 decides a timing of downloading the satellite orbit information from the AGNSS server 3. In the first embodiment, although a case where the determination information is information of a predetermined position and information of a predetermined time will be described, the determination information may include other kinds of information. For example, the determination information may be information regarding a condition for needing accurate positioning using the GNSS satellites 2 in providing a service, such as a charging service, with the in-vehicle device 10. In the first embodiment, although a case where the determination information acquisition unit 11 acquires the determination information stored in the determination information storage unit 16 has been described, the determination information acquisition unit 11 may acquire the determination information through communication with a device, such as an external server of the in-vehicle device 10.

In the first embodiment, the determination information acquisition unit 11 acquires information of a predetermined position from the determination information storage unit 16 as determination information and inputs the acquired information to the timing decision unit 12.

The timing decision unit 12 decides the timing of downloading the satellite orbit information from the AGNSS server 3 through the cellular network N. The timing decision unit 12 decides the timing based on the determination information input from the determination information acquisition unit 11.

The current position specification unit 13 is configured to specify a current position of the vehicle 1. The current position specification unit 13 calculates the distance between each of a plurality of GNSS satellites 2 and the vehicle 1 based on the time signal received by the satellite signal reception unit 15 from each of the GNSS satellites 2 and specifies the three-dimensional current position of the vehicle 1.

The charging processing unit 14 is configured to provide a charging service as a predetermined service. Specifically, the charging processing unit 14 is configured to execute the charging processing to the vehicle 1 positioned within the predetermined charging area.

Figure 3:
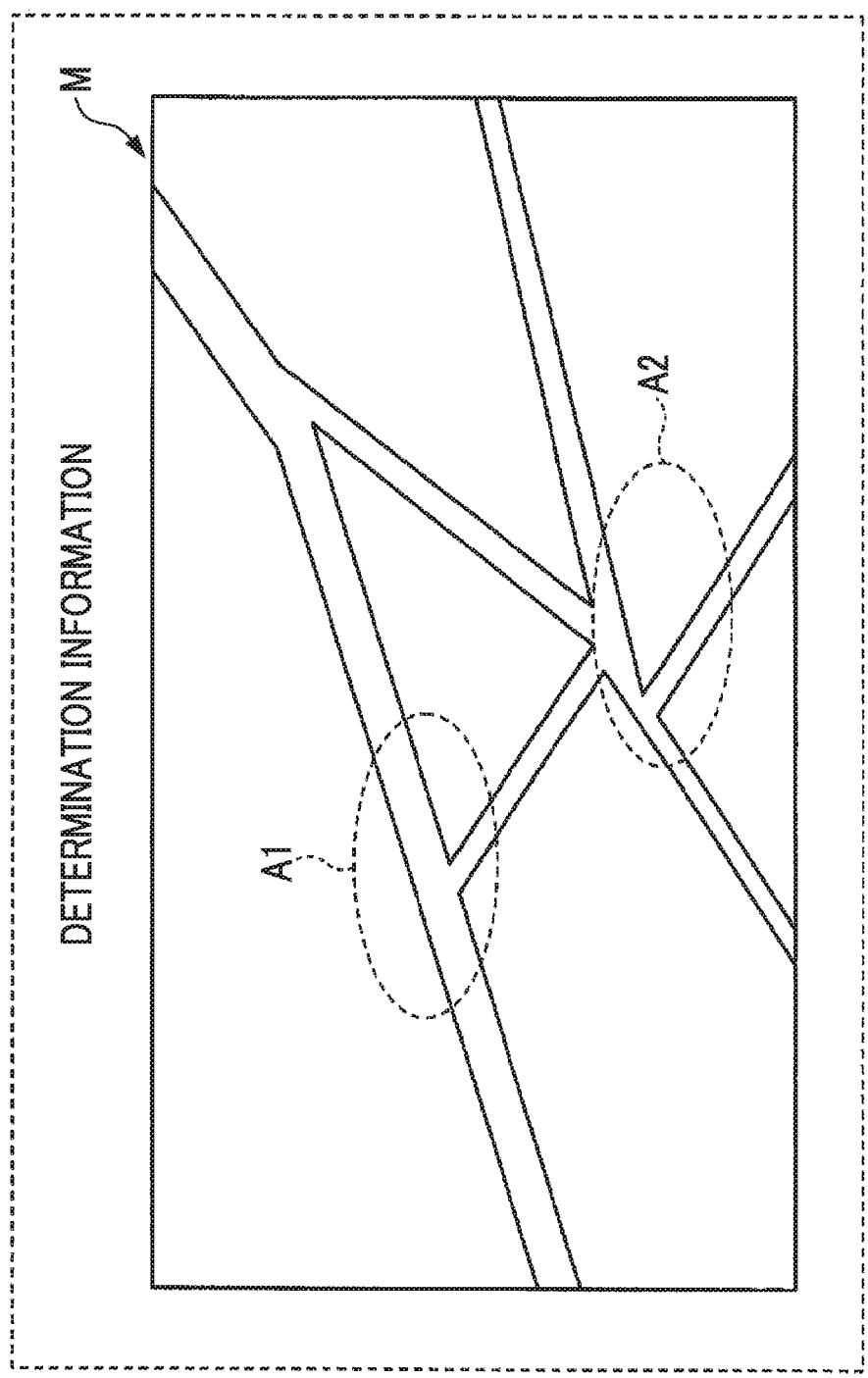
FIG. 3 is a first explanatory view showing an example of determination information of the in-vehicle device according to the first embodiment.

The determination information storage unit 16 is configured to store the determination information. In the first embodiment, charging map information shown in FIG. 3 and charging time information shown in FIG. 4 are stored as the determination information. The charging map information is information of a predetermined position, and as shown in FIG. 3, includes map information M that is information of a map, on which the vehicle 1 travels, and information of each charging area (for example, A1, A2, . . . ) set in the position map information M.

The charging time information is information of a predetermined time, and as shown in FIG. 4, is information in which each charging area set in the map information M is associated with a charging start time and a charging end time. For example, a first row of the determination information shown in FIG. 4 indicates that a toll is charged to the vehicle 1 passing through the charging area A1 for a time (time period) "07:00:00 to 18:00:00" between the charging start time "07:00:00" and the charging end time "18:00:00". Note that the charging time information may include, for example, a day of week on which charging is made, a cycle (every day, every other day, or the like) in which charging is made, and other kinds of information on each charging area.

The satellite orbit information reception unit 18 stores the satellite orbit information of the GNSS satellites 2 downloaded from the AGNSS server 3. Note that the satellite orbit information received from the GNSS satellites 2 may be stored in the satellite orbit information reception unit 18.

The satellite orbit information reception unit 18 is configured to download the satellite orbit information of the GNSS satellites 2 from the AGNSS server 3 through the cellular network N.

Processing Flow of Operation of In-Vehicle Device According to First Embodiment

Figure 5:
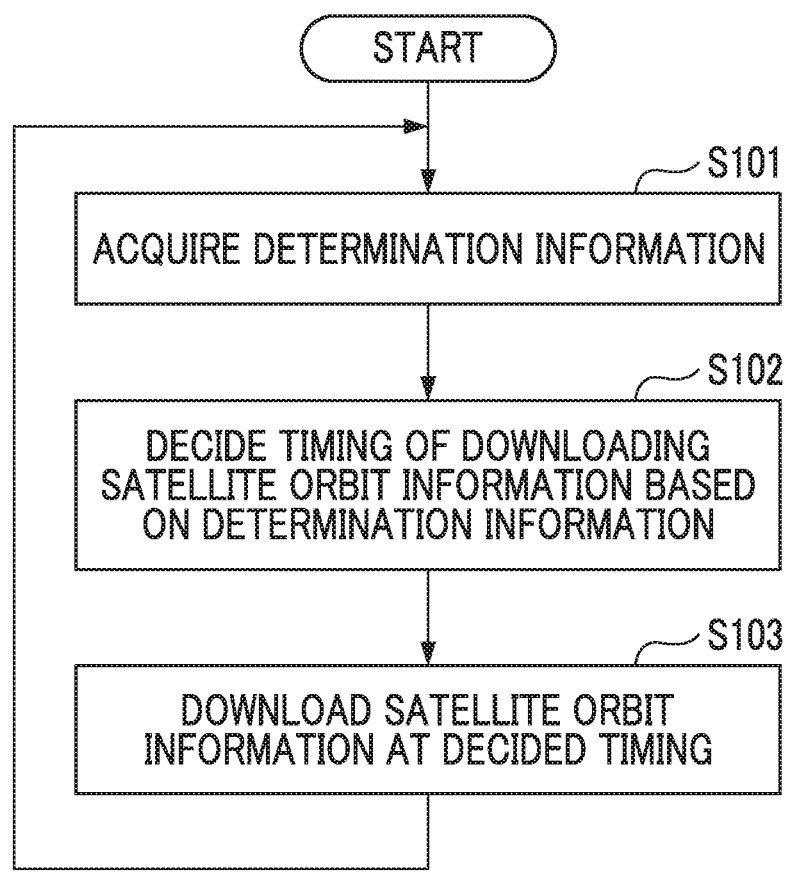
FIG. 5 is a flowchart showing the operation of the in-vehicle device according to the first embodiment.

FIG. 5 is a flowchart showing the operation of the in-vehicle device 10 according to the first embodiment. The operation of the in-vehicle device 10 according to the first embodiment will be described referring to FIG. 5.

As shown in FIG. 5, in a case where download processing of the satellite orbit information is started, the determination information acquisition unit 11 acquires information of a predetermined position (charging map information) and information of a predetermined time (charging time information) as the determination information (Step S101). Specifically, the determination information acquisition unit 11 refers to the determination information storage unit 16 and acquires the charging map information and the charging time information stored in the determination information storage unit 16. The determination information acquisition unit 11 inputs the acquired charging map information and charging time information to the timing decision unit 12.

Next, the timing decision unit 12 decides the timing of downloading the satellite orbit information from the AGNSS server 3 based on the input determination information (charging map information as information of the predetermined position and charging time information as information of the predetermined time) (Step S102). Specifically, the timing decision unit 12 decides a timing, at which a current position of the vehicle 1 coincides with any one of predetermined positions included in the charging map information and a current time is a predetermined preparation time before a charging time, as the timing of downloading the satellite orbit information. The current position of the vehicle 1 is input from the current position specification unit 13 to the timing decision unit 12. Note that, in a case where an engine of the vehicle 1 is stopped, the timing decision unit 12 may decide the timing using the current position finally specified by and stored in the current position specification unit 13 before the engine is stopped.

For example, in FIG. 3, in a case where the vehicle 1 travels and enters the charging area A1 (predetermined position), the timing decision unit 12 determines that the current position of the vehicle 1 coincides with the predetermined position included in the charging map information. Accordingly, the timing decision unit 12 decides a timing, at which a current time is five minutes (predetermined preparation time) before the charging time (predetermined time) "07:00:00 to 18:00:00", on the charging area A1 as the timing of downloading the satellite orbit information. That is, the timing decision unit 12 issues an instruction such that the satellite orbit information reception unit 18 downloads the satellite orbit information at a timing at which the vehicle 1 enters the charging area A1 and the current time becomes "06:55:00". Note that, in the first embodiment, although a case where the predetermined preparation time is five minutes has been described, the predetermined preparation time, the predetermined preparation time may be a time other than five minutes. The predetermined preparation time may be a minimum time needed to download the satellite orbit information until the predetermined time.

In a case where the instruction of the timing decision unit 12 is received, the satellite orbit information reception unit 18 downloads the satellite orbit information from the AGNSS server 3 at the timing decided by the timing decision unit 12 (Step S103). The satellite orbit information downloaded by the satellite orbit information reception unit 18 is stored in the satellite orbit information reception unit 18. Hereinafter, returning to Step S101, the processing of the flow shown in FIG. 5 is repeated. The processing of the flow shown in FIG. 5 is executed even while the engine of the vehicle 1 is stopped.

Note that, in the above description, a case where the timing decision unit 12 decides the timing of downloading the satellite orbit information based on the determination information including both of information of the predetermined position and information of the predetermined time has been described. In contrast, the timing decision unit 12 may decide the timing of downloading the satellite orbit information based on only any one of information of the predetermined position and information of the predetermined time.

(Operation and Effects)

As above, the in-vehicle device 10 according to the first embodiment includes the determination information acquisition unit 11 that acquires the determination information relating to the vehicle 1, and the timing decision unit 12 that decides the timing of downloading the satellite orbit information based on the determination information.

In this way, since the in-vehicle device 10 according to the first embodiment decides the timing of downloading the satellite orbit information from the AGNSS server 3 based on the determination information relating to the vehicle 1, download can be performed at an appropriate timing. Accordingly, frequent download is prevented, whereby unneeded communication between the in-vehicle device 10 and the AGNSS server 3 can be suppressed, and battery consumption due to communication of the in-vehicle device 10 can be reduced.

In the in-vehicle device 10 according to the first embodiment, the determination information includes information of the predetermined position, and the timing decided by the timing decision unit 12 is the timing at which the current position of the vehicle 1 becomes the predetermined position.

With this, download is performed based on information of the predetermined position at the timing at which the current position of the vehicle 1 becomes the predetermined position, whereby download can be performed at an appropriate timing at which the need to download the satellite orbit information is high.

In the in-vehicle device 10 according to the first embodiment, the determination information includes information of the predetermined time, and the timing decided by the timing decision unit 12 is the timing at which the current time is the predetermined preparation time before the predetermined time.

With this, download is performed based on information of the predetermined time at the timing at which the current time is the predetermined preparation time before the predetermined time, whereby download can be performed at an appropriate timing at which the need to download the satellite orbit information is high.

MODIFICATION EXAMPLE OF FIRST EMBODIMENT

Figure 6:
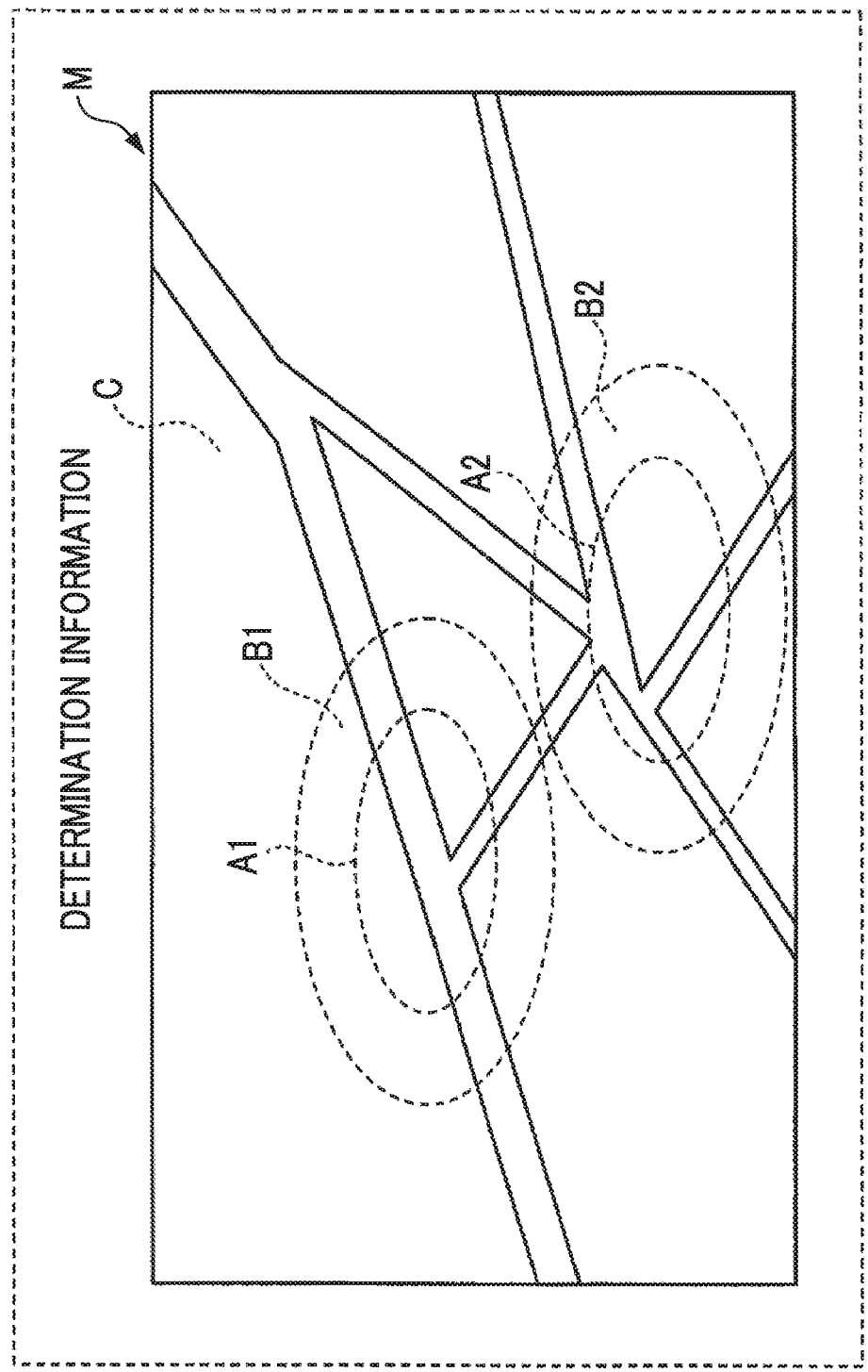
FIG. 6 is a first explanatory view showing an example of determination information of an in-vehicle device according to a modification example of the first embodiment.

FIG. 6 is a first explanatory view showing an example of determination information of an in-vehicle device 10 according to a modification example of the first embodiment. The in-vehicle device 10 according to the modification example of the first embodiment will be described referring to FIG. 6. Note that the components of the in-vehicle device 10 according to the modification example of the first embodiment have the same configurations and functions as the components of the in-vehicle device 10 according to the first embodiment unless specifically described, and thus, overlapping description will not be repeated.

In the modification example of the first embodiment, as shown in FIG. 6, the charging map information (information of the predetermined position) as the determination information includes information of a position of each preparation area (B1, B2, . . . ) set to surround each charging area, in addition to the map information M and information of the position of each charging area (A1, A2, . . . ). As shown in FIG. 6, the charging map information (information of the predetermined position) includes information of a position of a non-target area C that is an area corresponding to neither a charging area nor a preparation area in the map information M.

In the modification example of the first embodiment, in the processing of Step S102 shown in FIG. 5, the timing decision unit 12 decides the timing of downloading the satellite orbit information based on the determination information (information of the predetermined position) such that a download frequency is changed. For example, in FIG. 6, while the vehicle 1 is staying in the charging area (A1, A2, . . . ), the timing decision unit 12 decides the timing of downloading so as to download the satellite orbit information from the AGNSS server 3 at a frequency of once every three days.

While the vehicle 1 is staying in the preparation area (B1, B2, . . . ), the timing decision unit 12 decides the timing so as to download the satellite orbit information from the AGNSS server 3 at a frequency of once every five days. While the vehicle 1 is staying in the non-target area C, the timing decision unit 12 does not download the satellite orbit information from the AGNSS server 3.

That is, the timing decision unit 12 determines whether or not the current position of the vehicle 1 coincides with any one of the charging area (A1, A2, . . . ), the preparation area (B1, B2, . . . ), and the non-target area C based on the determination information, and decides such that the download frequency is changed according to the area where the vehicle 1 is positioned. The specific values of the download frequency described above are example values, and any values may be specified.

(Operation and Effects)

As above, in the in-vehicle device 10 according to the modification example of the first embodiment, the timing decision unit 12 decides the timing of downloading the satellite orbit information based on the determination information such that the download frequency is changed.

In this way, in the modification example of the first embodiment, since the timing of downloading the satellite orbit information is decided based on the determination information such that the download frequency is changed, the number of times of download can be adjusted according to the need to download of the satellite orbit information. Accordingly, unneeded download is avoided, whereby unneeded communication between the in-vehicle device 10 and the AGNSS server 3 can be further suppressed, and battery consumption due to communication of the in-vehicle device 10 can be further reduced.

In the modification example of the first embodiment described above, although a case where the determination information is information of the predetermined position has been described, the timing decision unit 12 may decide the timing based on determination information other than information of the predetermined position such that the download frequency is changed. For example, the determination information may be information of a predetermined vehicle type.

In this way, since the timing decision unit 12 decides the timing based on information of the predetermined vehicle type such that the download frequency is changed, the number of times of download can be adjusted according to the characteristic of the vehicle type.

Specifically, in a case where the determination information is information of a two-wheeled vehicle (information of the predetermined vehicle type), the timing decision unit 12 may decide the timing of downloading the satellite orbit information such that the download frequency becomes higher in a case where a vehicle type of the vehicle 1 is a two-wheeled vehicle (predetermined vehicle type) than in a case where the vehicle 1 is other than a two-wheeled vehicle (predetermined vehicle type). With this, the number of times of download can be adjusted to be increased on a vehicle type for which the need to download the satellite orbit information is high. In particular, in a case where the vehicle 1 is a two-wheeled vehicle, it is possible to increase a possibility that the satellite orbit information is updated with frequent download. Accordingly, a lightweight two-wheeled vehicle that can start to travel immediately after an engine is started can perform appropriate positioning even though the lightweight two-wheeled vehicle enters the charging area immediately with traveling after the engine start and needs positioning. Note that, in the above description, although the predetermined vehicle type is a two-wheeled vehicle has been described, a lightweight vehicle other than a two-wheeled vehicle may be applied.

On the other hand, in a case where the determination information is information of a bus (information of the predetermined vehicle type), the timing decision unit 12 may decide the timing of downloading the satellite orbit information such that the download frequency becomes lower in a case where the vehicle type of the vehicle 1 is a bus (predetermined vehicle type) than in a case where the vehicle 1 is other than a bus (predetermined vehicle type). Since the bus having a heavy weight cannot start to travel immediately after the engine is started, the bus can be brought into a state in which positioning is possible before entering the charging area even though the satellite orbit information is downloaded after the engine is started. With this, the number of times of download can be adjusted to be reduced on a vehicle type for which the need to download the satellite orbit information is low. In particular, in a case where the vehicle 1 is a bus, frequent download is prevented, whereby unneeded communication between the in-vehicle device 10 and the AGNSS server 3 can be suppressed, and battery consumption due to communication of the in-vehicle device 10 can be reduced. Note that, in the above description, although a case where the predetermined vehicle type is a bus has been described, a vehicle having a heavy weight other than a bus may be applied.

Second Embodiment

Figure 7:
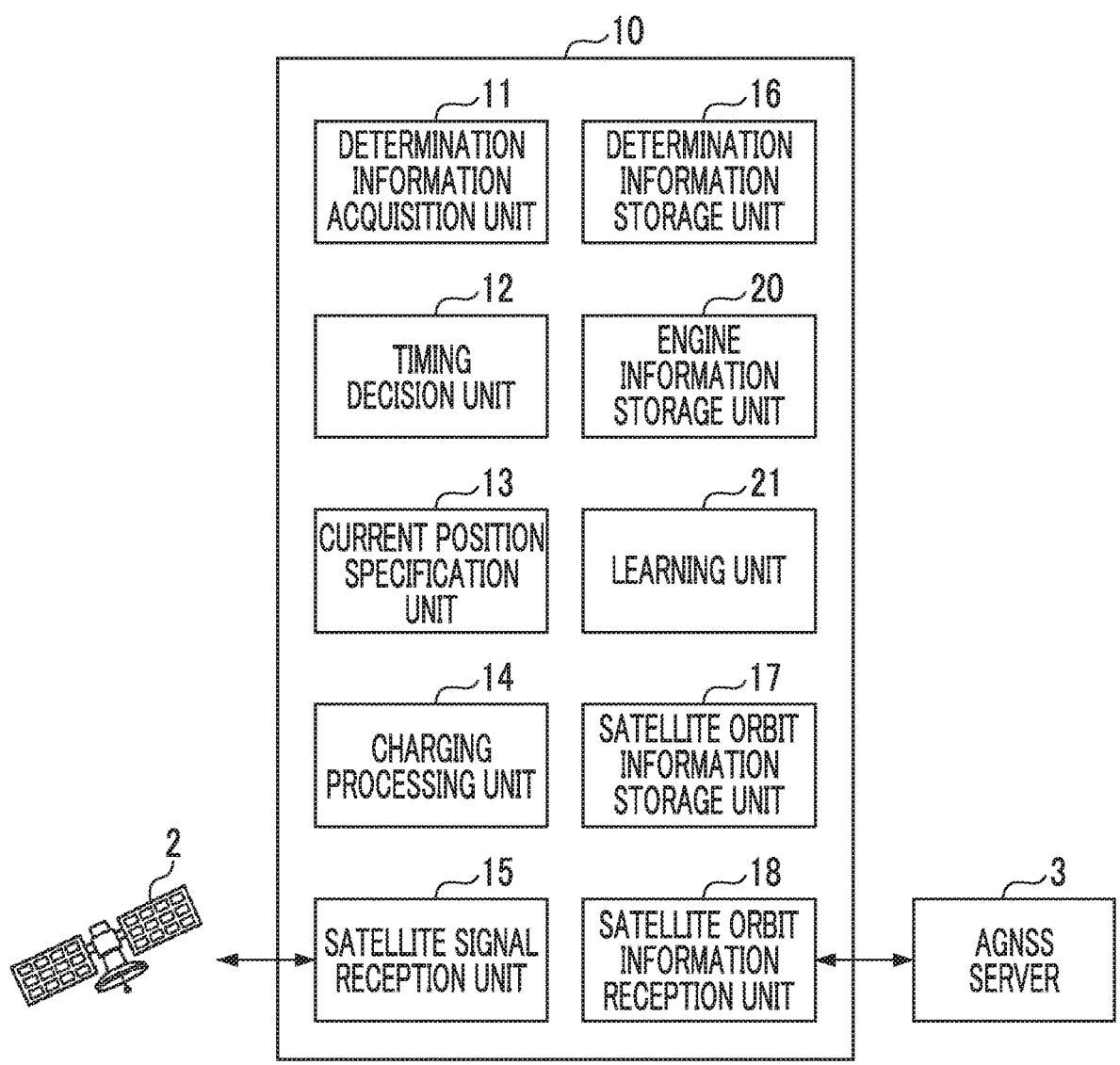
FIG. 7 is a block diagram illustrating the functional configuration of an in-vehicle device according to a second embodiment.
Figure 8:
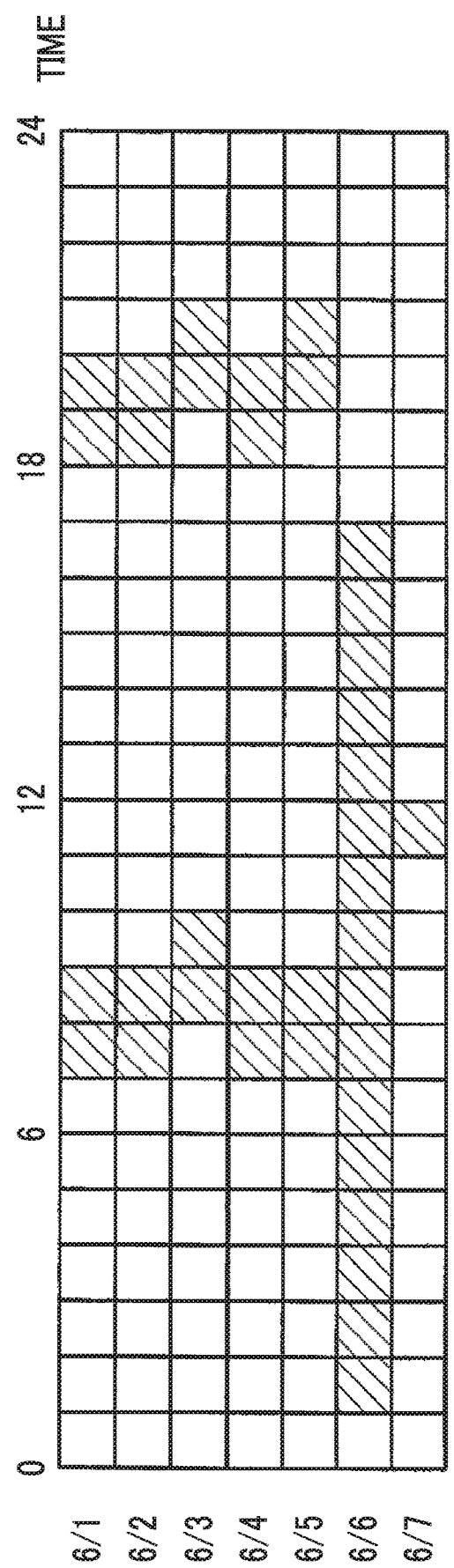
FIG. 8 is an explanatory view illustrating a learning operation of the in-vehicle device according to the second embodiment.
Figure 9:
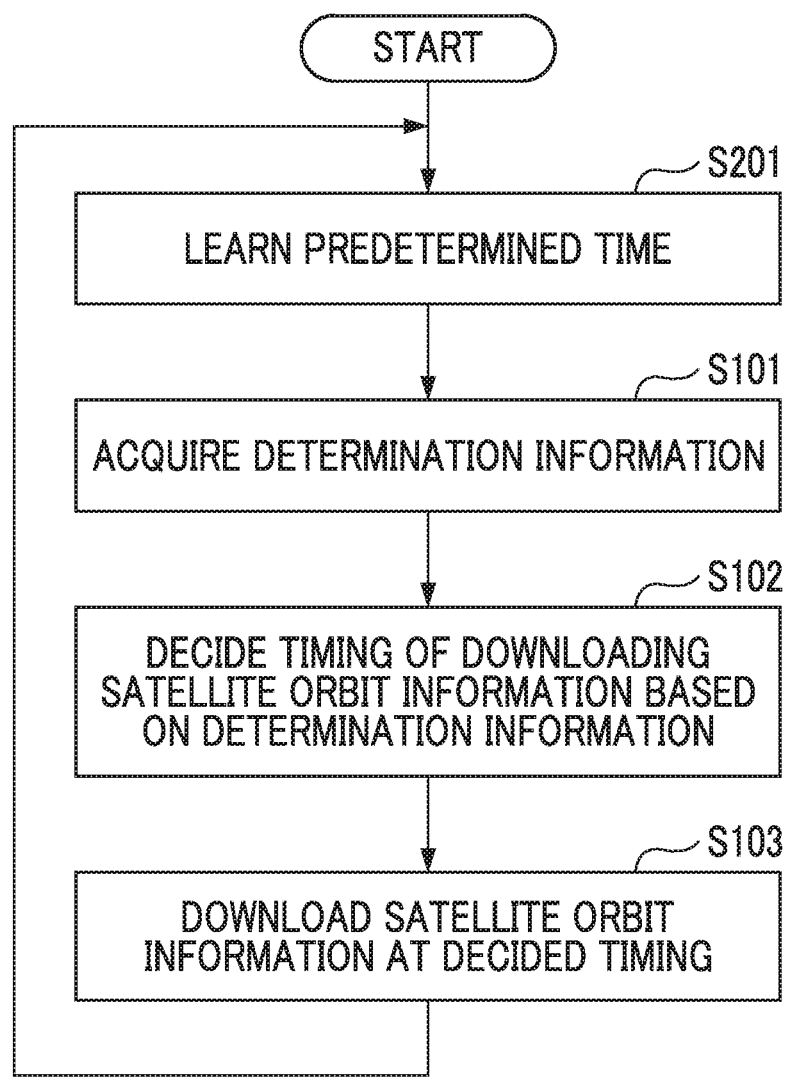
FIG. 9 is a flowchart showing the operation of the in-vehicle device according to the second embodiment.

FIG. 7 is a block diagram showing the functional configuration of an in-vehicle device 10 according to a second embodiment. FIG. 8 is an explanatory view illustrating a learning operation of the in-vehicle device 10 according to the second embodiment. FIG. 9 is a flowchart showing the operation of the in-vehicle device 10 according to the second embodiment. The in-vehicle device 10 according to the second embodiment will be described referring to FIGS. 7 to 9. Note that the components of the in-vehicle device 10 according to the second embodiment have the same configurations and functions as the components of the in-vehicle device 10 according to the first embodiment unless specifically described, and thus, overlapping description will not be repeated.

Functional Configuration of In-Vehicle Device According to Second Embodiment

As shown in FIG. 7, the in-vehicle device 10 according to the second embodiment further includes an engine information storage unit 20 and a learning unit 21.

Determination information in the second embodiment is information of a predetermined time. Specifically, the predetermined time is a time having a high use frequency of the vehicle 1 of the user U.

The engine information storage unit 20 is configured to store a start time when the engine of the vehicle 1 is started and a stop time when the engine of the vehicle 1 is stopped.

The learning unit 21 is configured to learn the time having the high use frequency of the vehicle 1. Specifically, the learning unit 21 learns as follows. In the explanatory view shown in FIG. 8, the horizontal axis indicates time, and the vertical axis indicates date. As shown in FIG. 8, the learning unit 21 divides one day into 24 in hours, and classifies each divided time in the last one week (in FIG. 8, a day on which learning processing is executed is 6/8, and the last one week is seven days of 6/1 to 6/7) into any one of a start state (hatched cell) in which the engine of the vehicle 1 is started or a stop state (blank cell) in which the engine of the vehicle 1 is not started. In this case, the learning unit 21 refers to the engine information storage unit 20, acquires the start time when the engine of the vehicle 1 is started and the end time when the engine of the vehicle 1 is stopped, classifies the divided time at least partially overlapping a time from the start time to the stop time, and classifies the divided time not at all overlapping the time from the start time to the stop time into the stop state.

The learning unit 21 determines, based on the results classified as described above, the time out of the time in one day classified as the start state appearing three or more times in the last one week as the time having the high use frequency of the vehicle 1 of the user U. In a case shown in FIG. 8, the learning unit 21 determines that "a time (07:00:00 to 08:00:00) from seven o'clock to eight o'clock" in one day is the time having the high use frequency of the vehicle 1 since the start state appears five times in the last one week. Similarly, the learning unit 21 determines that "a time (08:00:00 to 09:00:00) from eight o'clock to nine o'clock", "a time (18:00:00 to 19:00:00) from 18 o'clock to 19 o'clock", and "a time (19:00:00 to 20:00:00) from 19 o'clock to 20 o'clock" is the time having the high use frequency of the vehicle 1.

The learning unit 21 is configured to store the time having the high use frequency of the vehicle 1 obtained through determination in the determination information storage unit 16 as information of the predetermined time. Note that, in FIG. 8, continuous times are combined, and the learning unit 21 stores "07:00:00 to 09:00:00" and "18:00:00 to 20:00:00" in the determination information storage unit 16 as information of the predetermined time.

In the above-described example, although a case where the learning unit 21 learns based on information of the engine in the last one week has been described, the learning unit 21 may learn based on information of the engine in any past period. In the above-described example, although a case where the learning unit 21 learns while dividing one day into 24 in hours has been described, the learning unit 21 may learn, for example, with division in any time units, such as in minutes or in seconds. Alternatively, the learning unit 21 may enlarge a division unit and may learn with division in days, in weeks, or in months.

In the above-described example, although a case where the learning unit 21 determines the time classified as the start state appearing three or more times as the time having the high use frequency of the vehicle 1 of the user U has been described, any number other than three may be used as a threshold value.

Processing Flow of Operation of In-Vehicle Device According to Second Embodiment The flowchart showing the operation of the in-vehicle device 10 according to the second embodiment shown in FIG. 9 is different from the flowchart showing the operation of the in-vehicle device 10 according to the first embodiment shown in FIG. 5 in that processing of Step S201 is added.

As shown in FIG. 9, in a case where the download processing of the satellite orbit information is started, the learning unit 21 learns the time having the high use frequency of the vehicle 1 as the predetermined time (Step S201). Specifically, as described above referring to FIG. 8, the learning unit 21 refers to the engine information storage unit 20 and classifies each divided time divided in hours in the last one week into any one of the start state in which the engine of the vehicle 1 is started and the stop state in which the engine of the vehicle 1 is not started. The learning unit 21 determines, based on the classified results, the time out of the time in one day classified as the start state appearing three or more times in the last one week as the time having the high use frequency of the vehicle 1 of the user U. The learning unit 21 stores information of the time having the high use frequency of the vehicle 1 obtained through determination in the determination information storage unit 16 as the determination information (information of the predetermined time).

In FIG. 8, the learning unit 21 finally stores information of "07:00:00 to 09:00:00" and "18:00:00 to 20:00:00" as information of the time having the high use frequency of the vehicle 1 in the determination information storage unit 16 as the determination information (information of the predetermined time).

Next, the determination information acquisition unit 11 acquires information of the predetermined time as the determination information (Step S101). Specifically, the determination information acquisition unit 11 refers to the determination information storage unit 16, and acquires information of the time having the high use frequency of the vehicle 1 stored in the determination information storage unit 16. The determination information acquisition unit 11 inputs the acquired time having the high use frequency of the vehicle 1 to the timing decision unit 12.

Next, the timing decision unit 12 decides the timing of downloading the satellite orbit information from the AGNSS server 3 based on the input determination information (the time having the high use frequency of the vehicle 1 that is information of the predetermined time) (Step S102). Specifically, the timing decision unit 12 decides the timing, at which the current time of the vehicle 1 is five minutes (predetermined preparation time) before the time having the high use frequency of the vehicle 1, as the timing of downloading the satellite orbit information. For example, in a case shown in FIG. 8, the timing at which the current time is five minutes (predetermined preparation time) before each of the time "07:00:00 to 09:00:00" and the time "18:00:00 to 20:00:00" is decided as the timing of downloading the satellite orbit information. That is, the timing decision unit 12 issues an instruction such that the satellite orbit information reception unit 18 downloads the satellite orbit information at the timing at which the current time is "06:55:00" or "17:55:00".

In a case where the instruction of the timing decision unit 12 is received, the satellite orbit information reception unit 18 downloads the satellite orbit information from the AGNSS server 3 at the timing decided by the timing decision unit 12 (Step S103). For example, in FIG. 8, the satellite orbit information reception unit 18 downloads the satellite orbit information from the AGNSS server 3 at the timing at which the current time is any one of "06:55:00" or "17:55:00". The satellite orbit information downloaded by the satellite orbit information reception unit 18 is stored in the satellite orbit information reception unit 18. Hereinafter, the process returns to Step S101, and the processing of the flow shown in FIG. 9 is repeated. The processing of the flow shown in FIG. 9 is executed even while the engine of the vehicle 1 is stopped.

(Operation and Effects)

As above, in the in-vehicle device 10 according to the second embodiment, the predetermined time is the time having the high use frequency of the vehicle 1.

In this way, the in-vehicle device 10 according to the second embodiment decides the timing of downloading the satellite orbit information from the AGNSS server 3 based on the time having the high use frequency of the vehicle 1. Accordingly, download can be performed at an appropriate timing at which the need to download the satellite orbit information is high. Accordingly, frequent download is prevented, whereby unneeded communication between the in-vehicle device 10 and the AGNSS server 3 can be suppressed, and battery consumption due to communication of the in-vehicle device 10 can be reduced.

The in-vehicle device 10 according to the second embodiment further includes a learning unit that learns the predetermined time (the time having the high use frequency of the vehicle 1).

With this, the accuracy of information of the predetermined time included in the determination information can be improved based on past information representing that the user U has used the vehicle 1. Accordingly, download can be performed at a more appropriate timing. In addition, for example, even though a use situation of the vehicle 1 of the user U is changed, the predetermined time included in the determination information can be updated to maintain the accuracy.

Figure 10:
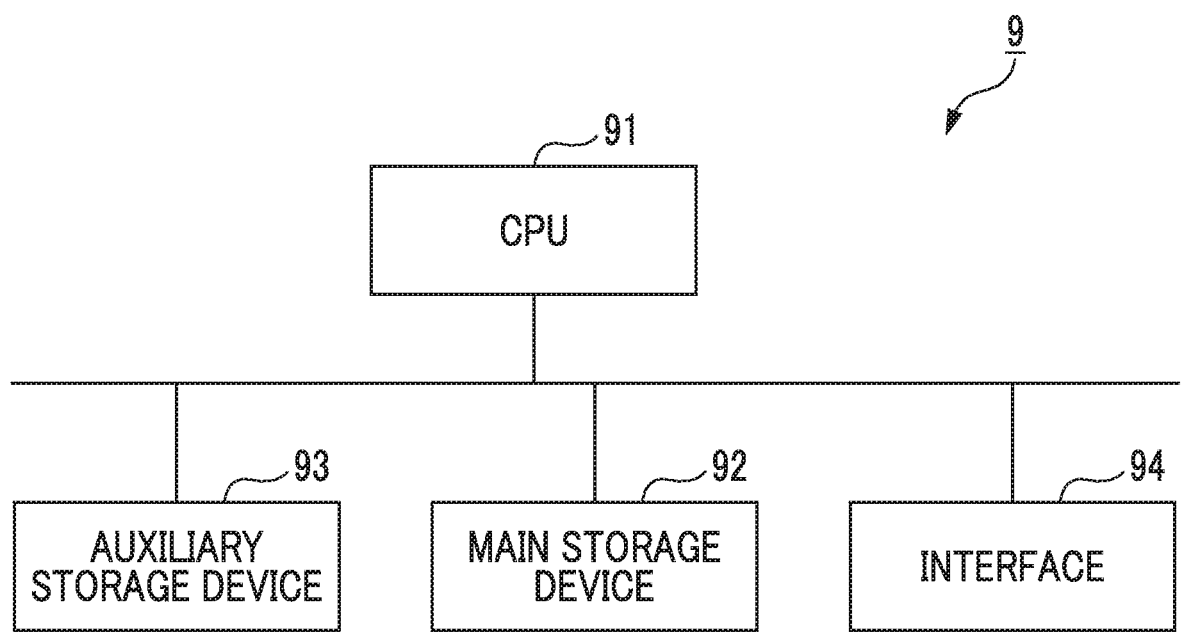
FIG. 10 is a schematic block diagram showing the configuration of a computer according to at least one embodiment.

FIG. 10 is a schematic block diagram showing the configuration of a computer according to at least one embodiment.

A computer 9 includes a CPU 91, a main storage device 92, an auxiliary storage device 93, and an interface 94.

The in-vehicle device 10 includes the computer 9. The operation of each processing unit is stored in the auxiliary storage device 93 in a format of a program. The CPU 91 reads the program from the auxiliary storage device 93, expands the program to the main storage device 92, and executes the above-described processing in compliance with the program. For example, the determination information acquisition unit 11, the timing decision unit 12, the current position specification unit 13, the charging processing unit 14, the satellite signal reception unit 15, the satellite orbit information reception unit 18, and the learning unit 21 may be the CPU 91.

The CPU 91 secures a storage area corresponding to the above-described database in the main storage device 92 or the auxiliary storage device 93 in compliance with the program. For example, the determination information storage unit 16, the satellite orbit information storage unit 17, and the engine information storage unit 20 of the in-vehicle device 10 may be secured in the auxiliary storage device 93.

As an example of the auxiliary storage device 93, a hard disk drive (HDD), a solid state drive (SSD), a magnetic disk, a magneto-optical disk, a compact disc read only memory (CD-ROM), a digital versatile disc read only memory (DVD-ROM), a semiconductor memory, or the like is exemplified. The auxiliary storage device 93 may be an internal medium directly connected to a bus of the computer 9 or may be an external medium connected to the computer 9 through the interface 94 or a communication line. In a case where the program is distributed to the computer 9 by the communication line, the computer 9 that receives the distributed program may expand the program to the main storage device 92 and may execute the above-described processing. In at least one embodiment, the auxiliary storage device 93 is a non-transitory tangible storage medium.

The program may implement a part of the above-described functions. In addition, the program may be a so-called differential file (differential program) that can implement the above-described functions through a combination with another program already stored in the auxiliary storage device 93.

Although several embodiments of the invention have been described above, the embodiments are presented as only examples, and thus, are not intended to limit the scope of the invention. The embodiments can be carried out in other various forms, and various omissions, replacements, and alterations may be made within the scope without departing from the spirit of the invention. The embodiments or modifications thereof are included in the inventions disclosed in the claims and equivalents thereof as included in the scope and the spirit of the invention.

INDUSTRIAL APPLICABILITY

With the in-vehicle device, the vehicle, the method for downloading satellite orbit information, and the program for downloading satellite orbit information, download of the satellite orbit information using the AGNSS can be performed at an appropriate timing, and suppression of unneeded communication and reduction of battery consumption can be achieved.

REFERENCE SIGNS LIST

1: vehicle
2: GNSS satellite
3: AGNSS server
9: computer
10: in-vehicle device
11: determination information acquisition unit
12: timing decision unit
13: current position specification unit
14: charging processing unit
15: satellite signal reception unit
16: determination information storage unit
17: satellite orbit information storage unit
18: satellite orbit information reception unit
20: engine information storage unit
21: learning unit
91: CPU
92: main storage device
93: auxiliary storage device
94: interface
M: map information
A1, A2: charging area
B1, B2: preparation area
C: non-target area
U: user

The invention claimed is:

1. An in-vehicle device comprising:
a determination information acquisition unit that acquires determination information relating to a vehicle;
a timing decision unit that decides a timing of downloading satellite orbit information from an assisted global navigation satellite system (AGNSS) server based on the determination information; and
a charging processing unit that executes a toll charging processing to the vehicle positioned within a predetermined toll charging area using the satellite orbit information downloaded at the timing,
wherein
the determination information indicates a condition for downloading the satellite orbit information from the AGNSS server due to the vehicle being positioned within the predetermined toll charging area,
the determination information includes information of a predetermined time,
the timing decided by the timing decision unit is a timing at which a current time is a predetermined preparation time before the predetermined time,
the predetermined preparation time is a minimum time needed to download the satellite orbit information, and
the predetermined time is a time when a number of times that an engine of the vehicle is started within a predetermined term is a predetermined number of times or more.

2. The in-vehicle device according to claim 1, wherein
the determination information includes information of a predetermined position, and
the timing decided by the timing decision unit is a timing at which a current position of the vehicle becomes the predetermined position.

3. The in-vehicle device according to claim 1, further comprising: a learning unit that learns the predetermined time.

4. The in-vehicle device according to claim 1, wherein
the timing decision unit decides the timing of downloading the satellite orbit information such that a download frequency is changed based on the determination information, and
the download frequency is a number of downloads in a time interval.

5. The in-vehicle device according to claim 4, wherein
the determination information includes information of a predetermined vehicle type, and
the timing decision unit decides the timing of downloading the satellite orbit information such that the download frequency becomes higher in a case where a vehicle type of the vehicle is the predetermined vehicle type than in a case where the vehicle type is other than the predetermined vehicle type.

6. The in-vehicle device according to claim 4, wherein
the determination information includes information of a predetermined vehicle type, and
the timing decision unit decides the timing of downloading the satellite orbit information such that the download frequency becomes lower in a case where a vehicle type of the vehicle is the predetermined vehicle type than in a case where the vehicle type is other than the predetermined vehicle type.

7. A vehicle in which the in-vehicle device according to claim 1 is mounted.

8. A method for downloading satellite orbit information, the method comprising:
a determination information acquisition step of acquiring determination information relating to a vehicle;
a timing decision step of deciding a timing of downloading the satellite orbit information from an assisted global navigation satellite system (AGNSS) server based on the determination information; and
a charging processing step of executing a toll charging processing to the vehicle positioned within a predetermined toll charging area using the satellite orbit information downloaded at the timing,
wherein
the determination information indicates a condition for downloading the satellite orbit information from the AGNSS server due to the vehicle being positioned within the predetermined toll charging area,
the determination information includes information of a predetermined time,
the timing decided in the timing decision step is a timing at which a current time is a predetermined preparation time before the predetermined time,
the predetermined preparation time is a minimum time needed to download the satellite orbit information, and
the predetermined time is a time when a number of times that an engine of the vehicle is started within a predetermined term is a predetermined number of times or more.

9. A non-transitory computer-readable medium that stores a program for downloading satellite orbit information, the program causing a computer as an in-vehicle device to function as:
a determination information acquisition unit that acquires determination information relating to a vehicle;
a timing decision unit that decides a timing of downloading satellite orbit information from an assisted global navigation satellite system (AGNSS) server based on the determination information; and a charging processing unit that executes a toll charging processing to the vehicle positioned within a predetermined toll charging area using the satellite orbit information downloaded at the timing, wherein the determination information indicates a condition for downloading the satellite orbit information from the AGNSS server due to the vehicle being positioned within the predetermined toll charging area, the determination information includes information of a predetermined time, the timing decided by the timing decision unit is a timing at which a current time is a predetermined preparation time before the predetermined time, the predetermined preparation time is a minimum time needed to download the satellite orbit information, and the predetermined time is a time when a number of times that an engine of the vehicle is started within a predetermined term is a predetermined number of times or more.

* * * * *